United States Patent [19]
Hudson

[11] 3,841,072
[45] Oct. 15, 1974

[54] METHOD AND APPARATUS FOR CUTTING SUGAR CANE

[75] Inventor: John Colin Hudson, St. Thomas, Barbados

[73] Assignee: F. M. McConnel Limited, Shropshire, England

[22] Filed: Aug. 29, 1972

[21] Appl. No.: 284,596

[30] Foreign Application Priority Data
May 2, 1972   Great Britain .................... 20461/72

[52] U.S. Cl. ................................................. 56/51
[51] Int. Cl. .......................................... A01d 47/00
[58] Field of Search ............... 56/51, 53, 55, 56, 62, 56/63

[56] References Cited
UNITED STATES PATENTS

| | | | |
|---|---|---|---|
| 753,558 | 3/1904 | Dupuy | 56/62 |
| 2,535,884 | 12/1950 | Woods | 56/55 |
| 3,584,443 | 6/1971 | Bulin | 56/63 |
| 3,596,448 | 8/1971 | Van Buskirk | 56/63 |
| 3,710,564 | 1/1973 | Sammann | 56/51 |

FOREIGN PATENTS OR APPLICATIONS

| | | | |
|---|---|---|---|
| 673,306 | 6/1952 | Great Britain | 56/63 |

*Primary Examiner*—Antonio F. Guida
*Attorney, Agent, or Firm*—Watson, Cole, Grindle & Watson

[57] ABSTRACT

Apparatus for removing the leafy tops of sugar cane stalks comprises a device for mounting on a propelling vehicle, which device comprises a device rotatable about a horizontal axis extending transversely to the direction of travel of the vehicle at a distance above ground level and below the level of the tops of the sugar cane stalks. The device comprises a plurality of beater elements spaced around the axis of rotation of the device and extending along the axial length of the device. Each beater element comprises a plurality of axially spaced flexible fingers projecting from the beater element. The device is mounted on the vehicle in such a manner as to be capable of free up and down movement relative to the vehicle.

3 Claims, 2 Drawing Figures

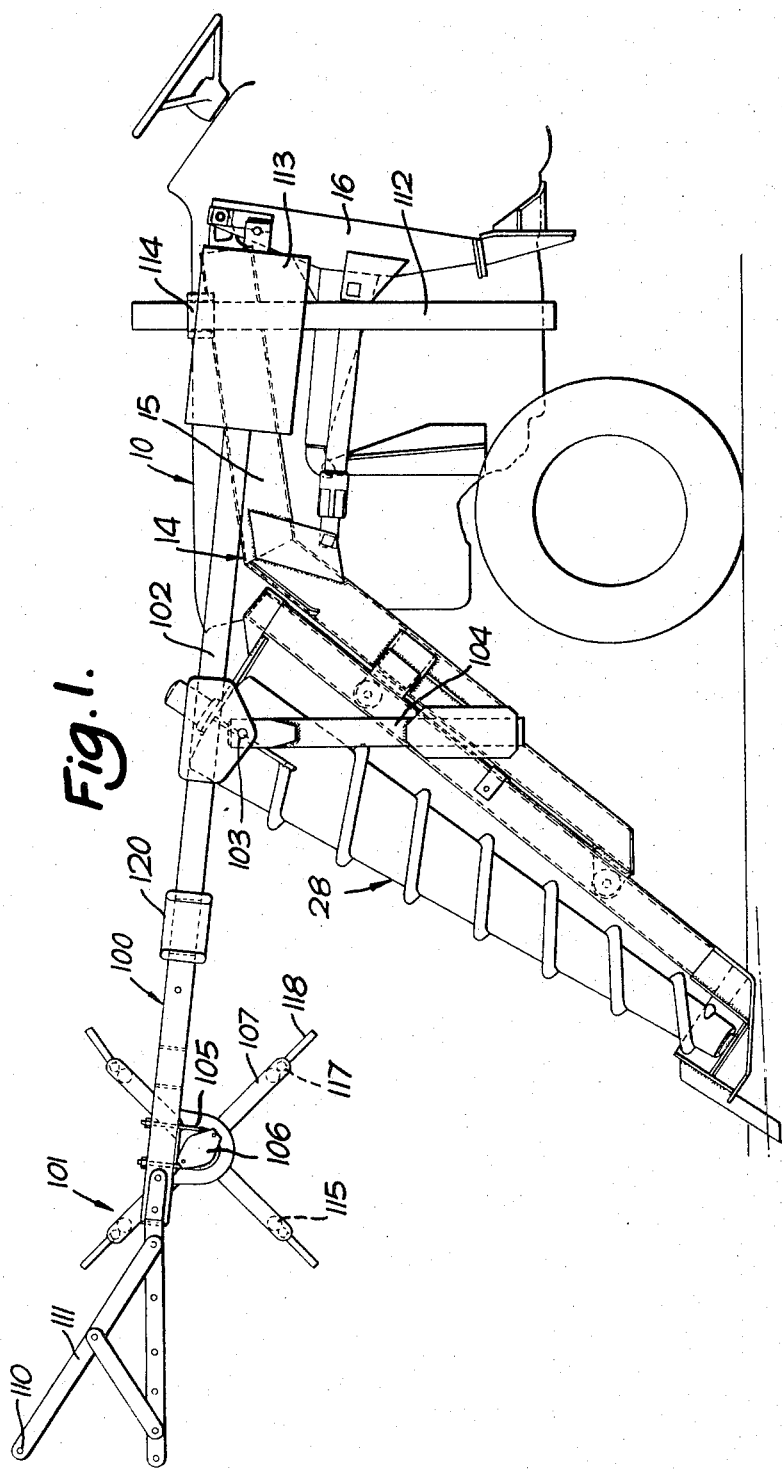

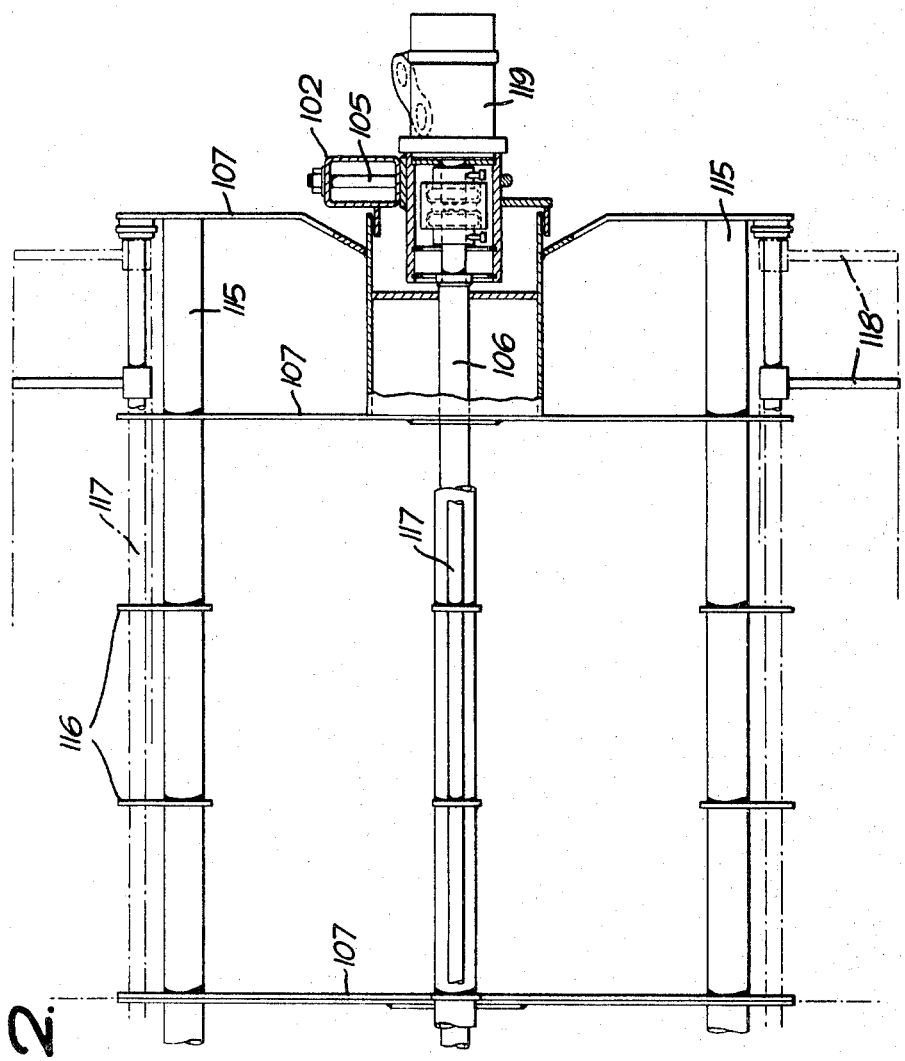

METHOD AND APPARATUS FOR CUTTING SUGAR CANE

The invention relates to the cutting of sugar cane and provides a method and apparatus for removing the leafy tops of sugar cane stalks.

In British Pat. application No. 53957/71, corresponding to U.S. Pat. application Ser. No. 284,598, filed Aug. 27, 1972, by Donald Alan Scott et al., there is described a method and apparatus for cutting sugar cane in which the apparatus passes through the growing cane to "comb" it and partially flatten it to form long swathes of partially flattened cane which is then severed near ground level by cutters mounted on the apparatus or carried by a following machine which passes over the cane in the same direction as the apparatus. It is found that the efficiency of such a machine is improved and there is less tendency for the cane to become tangled if the leafy tops of the sugar cane stalks are removed before the apparatus passes through the cane and it is an object of the present invention to provide a suitable method and apparatus for removing these leafy tops.

According to the invention a method of removing the leafy tops of sugar cane stalks comprises passing through the stalks, at a distance above ground level and below the tops of the stalks, a device rotatable by power means about a horizontal axis extending transversely to the direction of travel of the device, which device comprises a plurality of beater elements spaced around the axis of rotation of the device and extending along the axial length of the device.

According to the invention also, apparatus for removing the leafy tops of sugar cane stalks comprises a device for mounting on a propelling vehicle, which device is rotatable about a horizontal axis extending transversely to the direction of travel of the vehicle at a distance above ground level and below the level of the tops of sugar cane stalks, a plurality of beater elements spaced around the axis of rotation of the device and extending along the axial length of the device, and power means to rotate the device.

The beater elements are preferably equally spaced around the axis of rotation of the device and there may, for example, be provided four such beater elements.

Each beater element may comprise a plurality of flexible elongated elements spaced apart along the axial length of the device.

There may be provided an elongated abutment bar extending parallel to the axis of rotation of the device and located at such a distance behind the device that the flexible elongated elements strike the abutment bar as the device rotates. The leafy tops of the sugar cane stalks are thus cut off by being beaten between the elements and the fixed abutment bar.

Each elongated element may comprise a finger formed from resiliently flexible material. The flexible elongated elements may be mounted at intervals along the length of an axially extending bar on the device.

Preferably the device is adapted to be mounted on a vehicle in such manner as to be capable of up and down adjustment relatively to the vehicle. For example the device may be counterbalanced so as to be capable of free movement up and down relative to the vehicle. The device may thus ride up and down among the upper leafy tops of the sugar cane stalks, depending on the height of those stalks.

The following is a more detailed description of one embodiment of the invention reference being made to the accompanying drawings in which:

FIG. 1 is a side elevation of a device according to the invention mounted on the front of a tractor; and FIG. 2 is a part-sectioned front elevation of the assembly comprising the beater elements.

Referring to FIG. 1 a conventional tractor 10 carries at its front end a pivoted support structure 14 on which are mounted spaced combing elements 28 in the form of upwardly divergent tapering rollers. The elements 28 serve to "comb" the sugar cane as the tractor is driven forwards through it and the sugar cane is partially flattened to pass beneath the tractor and is severed, adjacent the ground, by cutters (not shown) mounted at the rear end of the tractor. However the apparatus for combing and cutting the cane does not form part of the present invention and will not therefore be described in detail. As mentioned above the present invention provides apparatus for removing the leafy tops of the sugar cane since it is found desirable to remove these leafy tops before the combing and cutting apparatus acts on the cane. It is thus convenient for the apparatus according to the present invention to be mounted on the combing and cutting machine although this is not essential and the present apparatus could equally well be carried by its own separate propelling vehicle.

The pivoted support structure 14 comprises two forwardly and downwardly extending side members 15 which are pivotally mounted, at their rear ends, to support brackets 16 on either side of the tractor. The side members 15 are connected by horizontal cross beams (not shown).

The device according to the present invention comprises a pivoted frame indicated generally at 100 projecting forwardly of the tractor and carrying on its forward end a rotating beater or flail indicated generally at 101. The pivoting frame 100 comprises parallel side beams 102 on opposite sides of the tractor, the side beams being pivotally connected at 103 to upright support posts 104 fixedly mounted on the downwardly extending paths of the side beams 15.

The forward ends of the side beams 102 carry brackets 105 between which extends a rotatable shaft 106 on which the flail 101 is mounted.

As best seen in FIG. 2 the flail comprises a number of cross-shaped frames 107 the outer extremities of which are connected by circular cross-section bars 115. Inbetween the cross-shaped frames 107 there are secured to the bars 115 brackets 116 and a rod 117 is disposed parallel to each bar 115, radially outward thereof, and supported in the brackets 116 and the outer extremities of the frames 107.

Each of the four rods 117 has spaced apart along its length a plurality of freely pivoted fingers 118 of rubber or resiliently flexible plastics material. The fingers are preferably so disposed that the fingers on one rod 117 are axially displaced with respect to the fingers on an adjacent rod 117, for example, the fingers may be arranged in what is effectively a spiral formation around the flail.

The flail 101 is rotatable by an hydraulic motor 119 mounted on the bracket 105 at the end of the shaft 106. Alternatively the shaft 106 of the flail may be driven by an electric motor or may be connected by a transmission to a power take-off shaft on the tractor.

An abutment bar 120, which is visible in an end elevational view in FIG. 1, extends between the side beams 102 to the rear of the flail 101. The abutment bar is parallel to the axis of rotation of the flail and extends across the whole length thereof and is so spaced from the axis of rotation of the flail that the fingers 118 strike the abutment bar 120 as the flail rotates.

A pusher rod 110, which is also visible in an end elevational view in FIG. 1, supported on brackets 111 is spaced in front of the flail 101 and extends across the whole length of the axis of rotation of the flail.

The end of the pivoted structure 100 remote from the flail 101 lies adjacent upright support posts 112 mounted on opposite sides of the tractor. The ends of the beams 102 have counterweights 113 secured to them which balance the weight of the flail. The flail is thus free to move up and down as it is pushed against the cane stalks and stops 114 on the posts 112 limit the pivoting movement of the structure 100. If required the rear ends of the beams 102 may be arranged to be clamped to the upright posts 112 should it be required to maintain the flail 101 in any particular position.

In practice however the flail is free to float up and down as it is pushed against the cane. The leafy tops of the cane are knocked or cut off by the flail, depending on its speed of rotation, and the cut stalks pass beneath the flail. It will be appreciated that the axial length of the flail, across the width of the tractor, is such that it acts on all of the swath of cane which passes between the combing elements 28. The leafy tops of the cane are beaten between the resilient elements 118 and the abutment bar 120. Preferably the abutment bar 120 is adjustable backwards and forwards on the beams 102 so as to vary the extent to which it is struck by the fingers 118. In some cases, for example, it may be desirable to adjust the abutment bar 120 rearwardly so that the fingers 118 do not in fact strike the abutment bar.

I claim:

1. Apparatus for removing the leafy tops of sugar cane stalks, the apparatus comprising in combination:

a rotatable beating device;

mounting means for mounting said beating device on a propelling vehicle and providing an axis of rotation for said beating device, said axis extending transversely to the direction of travel of said vehicle and being at a distance above ground level;

counterbalancing means allowing the device to freely move up and down relative to the vehicle in response to differences in cane stalk height encountered during the topping process;

said beating device including a plurality of beating elements, said beating elements being spaced around said axis of rotation and extending along said axis;

means to effect power driven rotation of said beating device;

an elongate abutment bar extending parallel to said axis of rotation of said beating device; and means securing said bar at a distance behind said beating device to establish a clearance between said abutment bar and said rotatable beating elements.

2. The apparatus of claim 1 wherein each said beating element comprises an elongate finger of resiliently flexible material, and wherein there are provided means mounting said resiliently flexible fingers at intervals along the length of respective axially extending bars on said device.

3. The apparatus of claim 1, further comprising a pusher bar extending parallel to said axis of rotation of said device and spaced in front of the device in its direction of travel through the sugar cane.

* * * * *